(12) United States Patent
Klösters et al.

(10) Patent No.: US 11,522,872 B2
(45) Date of Patent: Dec. 6, 2022

(54) CAN TRANSCEIVER

(71) Applicant: NXP B.V., Eindhoven (NL)

(72) Inventors: Franciscus Johannes Klösters, Schaijk (NL); Rolf van de Burgt, Oosterbeek (NL); Thierry G. C. Walrant, Bouge (BE); Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 271 days.

(21) Appl. No.: 16/905,901

(22) Filed: Jun. 18, 2020

(65) Prior Publication Data
US 2021/0400056 A1    Dec. 23, 2021

(51) Int. Cl.
*H04L 9/40* (2022.01)
*H04L 12/40* (2006.01)
*H04L 12/417* (2006.01)

(52) U.S. Cl.
CPC ...... *H04L 63/126* (2013.01); *H04L 12/40026* (2013.01); *H04L 12/417* (2013.01); *H04L 63/10* (2013.01); *H04L 63/123* (2013.01); *H04L 2012/40215* (2013.01)

(58) Field of Classification Search
CPC ..... H04L 63/126; H04L 63/10; H04L 63/123; H04L 12/40026; H04L 12/417
See application file for complete search history.

(56) References Cited

U.S. PATENT DOCUMENTS

| | | | |
|---|---|---|---|
| 8,566,632 B2 | 10/2013 | van de Burgt et al. | |
| 9,954,892 B2 | 4/2018 | Elend | |
| 10,243,732 B1* | 3/2019 | Herzerg | H04L 9/0861 |
| 10,567,192 B2 | 2/2020 | van de Burgt et al. | |
| 10,922,264 B1* | 2/2021 | Adamson | H04L 12/40013 |
| 11,030,310 B2 | 6/2021 | Gilad et al. | |
| 2015/0191135 A1* | 7/2015 | Ben Noon | H04L 67/12 726/22 |
| 2016/0344552 A1* | 11/2016 | Sharma | G06F 21/602 |
| 2016/0381059 A1 | 12/2016 | Galula et al. | |
| 2018/0141439 A1* | 5/2018 | Shin | B60L 3/0084 |
| 2018/0152472 A1* | 5/2018 | Amano | H04W 12/122 |
| 2018/0189483 A1* | 7/2018 | Litichever | H04L 67/12 |
| 2019/0052654 A1 | 2/2019 | Juliato et al. | |
| 2020/0394341 A1* | 12/2020 | Bitton | G06F 21/85 |
| 2020/0412756 A1 | 12/2020 | Kishikawa et al. | |
| 2021/0400056 A1* | 12/2021 | Klösters | H04L 63/126 |
| 2022/0070022 A1* | 3/2022 | van de Burgt | H04L 7/033 |

OTHER PUBLICATIONS

Humayed Abdulmalik A: "Securing CAN-Based Cyber-Physical Systems", PhD Dissertation, University of Kansas, Dec. 4, 2018 (Dec. 4, 2018), pp. 1-225.

* cited by examiner

*Primary Examiner* — Harris C Wang

(57) ABSTRACT

A transceiver for sending and receiving data from a controller area network (CAN) bus is disclosed. The transceiver includes a microcontroller port, a transmitter and a receiver. The transceiver is configured to receive a data frame from a microcontroller via the microcontroller port and to determine if the microcontroller is authorized to send the data frame or part of it based on a message identifier in the data frame and the outcome of the arbitration process. If the microcontroller is unauthorized to send the data, the transceiver is configured to invalidate the data frame and disconnect the microcontroller from the CAN bus for a predetermined period.

18 Claims, 3 Drawing Sheets

CAN TRANSCEIVER

BACKGROUND

A Controller Area Network (CAN bus) is a vehicle bus standard designed to allow microcontrollers and devices to communicate with each other's applications without a host computer. CAN is a message-based protocol that uses two wires to enable multiple devices to communicate with each other and is used in many type of applications including automotive applications. For each message, the data in a packet is transmitted sequentially but in such a way that if more than one device transmits messages at the same time, only the highest priority message is able to continue while other devices stop transmitting their message. This process, known as "arbitration", is used by all sending devices and the device that attempts to send the highest priority message wins the arbitration. Transmitted packets are received by all devices, including by the transmitting device receiving its own message. However, a malicious device may attempt to hijack the bus control even after losing the arbitration.

CAN is a two-wire, half-duplex, high-speed serial network typically used to provide communications between network nodes without loading down microcontrollers. CAN transceivers interface between the CAN protocol controller and the physical wires of the CAN bus lines. A transceiver is used by a microcontroller to send and receive data on a CAN bus. A typical transceiver normally provides a ISO 11898 standard compliant communication over the CAN bus without scrutinizing the data content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a transceiver for sending and receiving data from a controller area network (CAN) bus is disclosed. The transceiver includes a microcontroller port, a transmitter and a receiver. The transceiver is configured to receive a data frame from a microcontroller via the microcontroller port and to determine if the microcontroller is authorized to send the data frame based on a message identifier in the data frame. If the microcontroller is unauthorized to send the data frame, the transceiver is configured to invalidate the data frame and disconnect the microcontroller from the CAN bus for a predetermined period.

In another embodiment, a method for preventing a node from interrupting a communication on a controller area network (CAN) bus is disclosed. The method includes receiving a data frame from anode, determining if the node is authorized to send the data frame based on a message identifier in the data frame and if the node is unauthorized to send the data frame, invalidating the data frame and disconnect the microcontroller from the CAN bus for a predetermined period.

In some examples, the invalidation of the data frame includes sending an invalidation signal on to the CAN bus. The transceiver is further configured to check during transmission of the error frame, the microcontroller had lost or won arbitration. The transceiver is also configured to generate and send an invalidation signal on to the CAN bus to invalidate the data frame if the microcontroller sends a part of the data frame after losing the arbitration. The transceiver may also be configured to send a dominant bit on to the CAN bus to invalidate the data frame if the controller sent the data frame after losing the arbitration. The transceiver also be configured to check if the microcontroller is authorized to send a message identifier embodied in the data frame if the controller sent the data frame after winning the arbitration.

In some embodiments, the transmitter includes an enable port to enable or disable the transmitter and the transceiver is configured to generate an enable/disable signal based on a detection of an unauthorized message identifier on a transmission line connected between the microcontroller port to receive an input from the microcontroller, and the transmitter. The transceiver may include a transmission line switch in a transmission line between the microcontroller port to receive data from the microcontroller, and the transmitter, the transceiver may be configured to turn the transmission line switch off based on a detection of an unauthorized message identifier on the transmission line.

In some examples, the generation of the invalidation signal (which in some examples can be a CAN error message) includes checking if the data frame received from the microcontroller is free of coding errors. The transceiver may be configured to allow the microcontroller to send an acknowledgement message. If the data frame sent by the microcontroller after losing arbitration includes a partial error message, the transceiver is configured to complete the partial error message and send the data frame on to the CAN bus.

In some examples, the transceiver may include a receiver line to connect the receiver to the microcontroller port, wherein the receiver line includes a receiver line switch for enabling or disabling the receiver line. The transceiver may be configured to disable the receiver line upon detecting a predetermined message identifier in a received message that is received from the CAN bus via the receiver. The transceiver may be configured to generate an invalidation signal upon detecting a dominant bit on a transmission line that connects the transmitter and the microcontroller through the microcontroller port.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
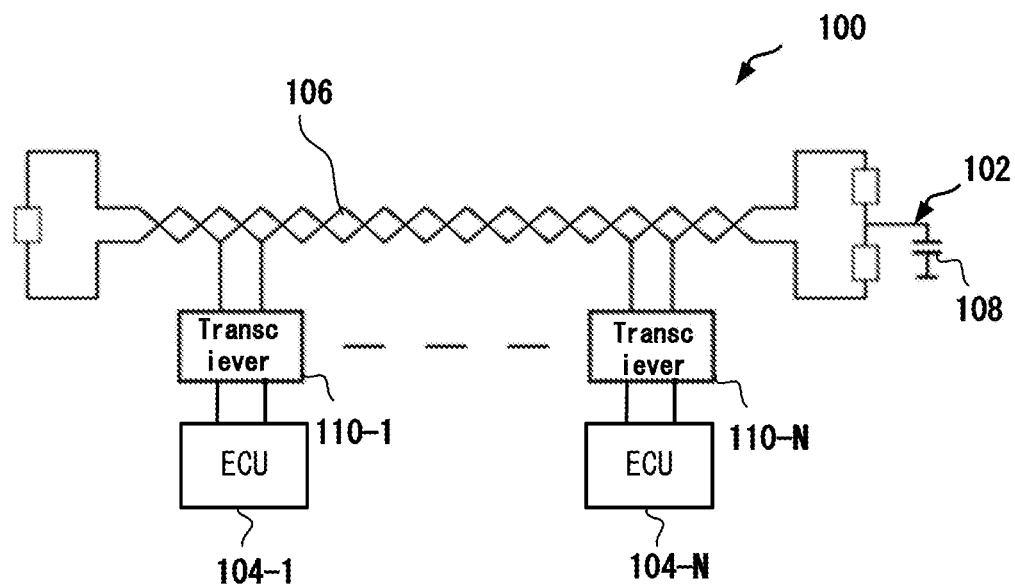
FIG. 1 depicts a controller area network (CAN) bus with a terminating end resistor and capacitor.

Note that figures are not drawn to scale. Not all components of the secure transceiver are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Controller Area Network (CAN) is a peer-to-peer network. Meaning that there is no master that controls when individual nodes have access to read and write data on the CAN bus. When a CAN node is ready to transmit data, it checks to see if the CAN bus is free and then simply writes a CAN frame onto the network. The CAN frames that are transmitted do not contain addresses of either the transmitting node or any of the intended receiving node(s). Instead, an arbitration ID that is unique throughout the network is contained in a data frame. All nodes on the CAN network receive every CAN frame that is transmitted by any node, and, depending on the message or arbitration identifier of the transmitted frame, each CAN node on the network decides whether to accept the frame for further processing.

If multiple nodes try to transmit messages onto the CAN bus at the same time, the node with the highest priority (lowest value of message or arbitration identifier) gets bus access. Lower-priority nodes (or messages) must wait until the bus becomes available before trying to transmit again.

CAN nodes (e.g., ECUs) use transceivers to interface with the CAN bus. The transceivers include an Rx port and a Tx port to enable communication with other CAN nodes through the CAN bus 100. Transceivers normally provide a simple interface for mode control from a device/microcontroller in a network. A typical standard transceiver makes use of up to two dedicated mode control pins, and this means that there are usually not more than four different states of operation.

The CAN protocol specifies the structure of a CAN frame. The CAN frame includes:

1. SOF (start-of-frame) bit—indicates the beginning of a message with a dominant (logic 0) bit.
2. Message or Arbitration ID—identifies the message and indicates the message's priority. Frames come in two formats—standard, which uses an 11-bit arbitration ID, and extended, which uses a 29-bit arbitration ID.
3. IDE (identifier extension) bit—allows differentiation between standard and extended frames.
4. RTR (remote transmission request) bit—serves to differentiate a remote frame from a data frame. A dominant (logic 0) RTR bit indicates a data frame. A recessive (logic 1) RTR bit indicates a remote frame.
5. DLC (data length code)—indicates the number of bytes the data field contains.
6. Data Field—contains 0 to 8 bytes of data.
7. CRC (cyclic redundancy check)—contains 15-bit cyclic redundancy check code and a recessive delimiter bit. The CRC field is used for error detection.
8. ACK (ACKnowledgement) slot—any CAN controller that correctly receives the message sends an ACK bit at the end of the message. The transmitting node checks for the presence of the ACK bit on the bus and reattempts transmission if no acknowledge is detected.
9. CAN Signal—an individual piece of data contained within the CAN frame data field. You also can refer to CAN signals as channels. Because the data field can contain up to 8 bytes of data in Classical CAN and up to 64 bytes in CAN FD.

FIG. 1 depicts a controller area network (CAN) bus 100. The CAN bus 100 includes terminating end resistors to suppress wave reflections. In some embodiments, a capacitor 108 may also be used at a terminating end. The CAN bus 100 includes a twisted wire pair 106. The twisted wire pair 106 includes CANH and CANL wires. The CAN bus 100 may include a plurality of communication microcontrollers or electronic control units (ECUs) 104-1 . . . 104-N coupled with the twisted wire pair through a plurality of secure transceivers 110-1 . . . 110-N. The capacitor 108 is typically 4.7 nF. The value of the capacitor 108 may be increased to approximately 100 nF. By increasing the value of the capacitor 108, a signal voltage at CANL or CANH during intermittent opens is improved. In one example, the resistors coupled with the capacitor 108 are typically 60 ohm each (total 120 ohm at each end).

As shown, the communication nodes (ECUs) 104-1 . . . 104-N are connected via an unshielded twisted pair 106. Termination is implemented at the far left- and right-hand side of the CAN bus 100. There are two options, either by using a single resistor as shown in the left-hand side of the CAN bus 100, or via two resistors and the capacitor 108, referred to as "split-termination" as shown on the right-hand side of the CAN bus 100. The latter method is commonly used as it offers an additional low-pass filtering to improve EMC performance.

Figure 2:
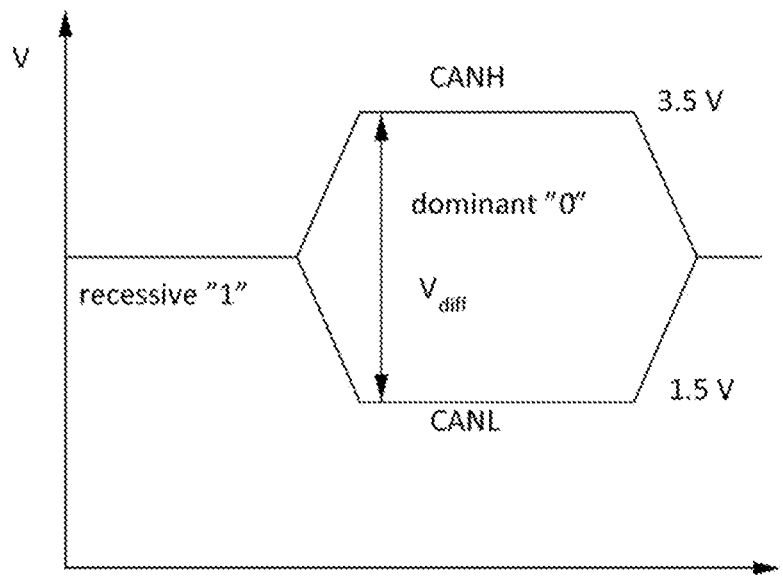
FIG. 2 depicts CAN bus communication protocol showing a representation of "0" and "1" based on a differential voltage at CANH and CANL.

As shown in FIG. 2, in normal operations (when no errors are present), the CAN bus 100 signals CANH and CANL are driven such that a differential voltage is generated (to send a dominant signal) or no differential signal is generated (to send a recessive bit). In some implementations, for a dominant bit ("0") the voltage at CANL is approximately 1.5V and the voltage at CANH is 3.5V and Vdiff represents a difference between the voltages at CANH and CANL. In some examples, Vdiff>0.9V may be considered a dominant bit and Vdiff<0.5 may be considered a recessive bit.

The communication nodes (e.g., ECUs 104-1 ... 104-N) on the CAN bus 100 that wish to send data on the CAN bus send a dominant SOF bit when the CAN bus 100 is idle (e.g., in the recessive state for a duration) to indicate that the nodes would like to send a data frame. Next, each node sends a message identifier. Note that the nodes are configured such that no two nodes can send a data frame including the same message identifier. The CAN protocol provides an 11-bit message identifier. In another version of the CAN protocol, the message identifier is specified to include 29 bits. The relative priority of a message identifier is characterized by the value of the message identifier. A lower value message identifier has a higher priority. For example, the message identifier with the value 11001000111 (0x647) will have a higher priority than the message identifier with the value 11011111111 (0x6FF).

If the ECU 104-1 and the ECU 104-N simultaneously send SOF bit and then start transmitting the message identifiers 11001000111 and 11011111111 respectively, on the fourth bit, the ECU 104-1 will win the arbitration because it will send a dominant bit, which will overwrite the recessive bit sent by the ECU 104-N. The ECU 104-1 will read a dominant bit after sending a dominant bit on the CAN bus 100 and will continue to send further data bits whereas the ECU 104-N will read a dominant bit after having sent a recessive bit (e.g., the fourth most significant bit in the above message identifier example) and will assume that it has lost the arbitration and will stop sending further data bits on the CAN bus 100, and will wait for the CAN bus 100 to be free again before attempting to send the message, at which time, the process of arbitration will start again.

However, the above described process can only work if the ECU 104-N honors the CAN protocol. If the ECU 104-N is a malicious component that is maliciously programmed to interrupt the data transmission on the CAN bus 100, the ECU 104-N, after having lost the arbitration, may still flip a later bit sent by the ECU 104-1 on the CAN bus 100. This can be done in the data phase (e.g. during the transmission of Data Field) of the CAN frame transmission to replace valid data being sent with malicious data. For example, when the ECU 104-N detects that the ECU 104-1 has sent a recessive bit, the ECU 104-N may send a dominant bit on the CAN bus 100 to overwrite the recessive bit sent by the ECU 104-1. Because a dominant bit overwrites a recessive bit on the CAN bus 100, the data being sent by the ECU 104-1 will no longer be a valid data. The ECU 104-N may continue to repeat this malicious action to cause a failure of data communication on the CAN bus 100. This failure may create a dangerous condition, for example, for a user of a vehicle. Suppose the ECU 104-1 was transmitting anti-lock braking data when the vehicle was skidding on an icy road, the failure of communication caused by malicious actions of the ECU 104-N may pose a serious risk of harm.

Assuming again that the ECU 104-N is a malicious ECU, the ECU 104-N may continue to tamper the data of high priority messages to virtually hijack the CAN bus 100 by prohibiting other ECUs (e.g., the ECU 104-1) from sending data on the CAN bus 100.

Figure 3:
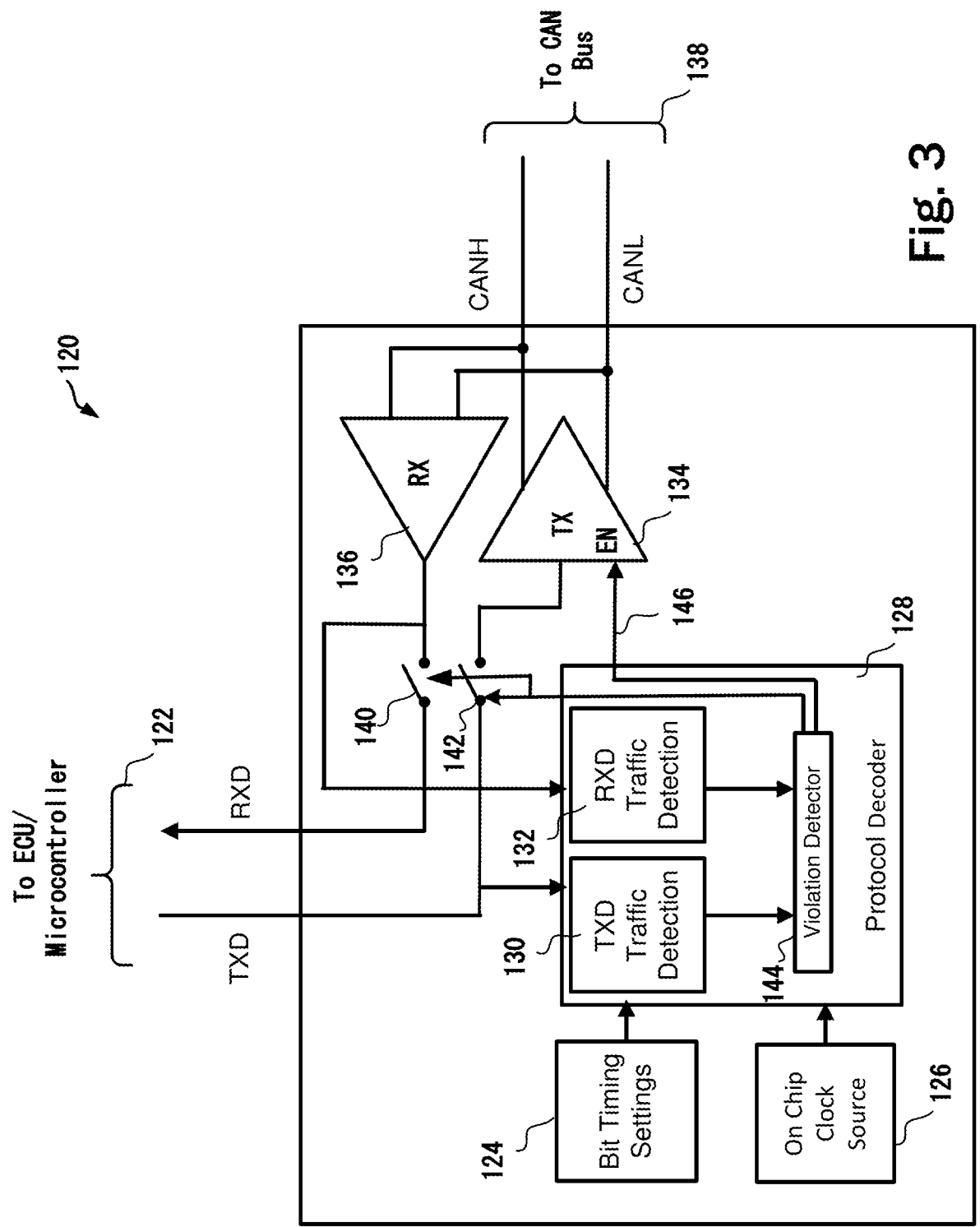
FIG. 3 shows a schematic of a secure transceiver in accordance with one or more embodiments of the present disclosure.

FIG. 3 shows a transceiver 120. Note that many components of the transceiver 120 have been omitted so as not to obfuscate the present disclosure. The transceiver 120 may replace the transceiver 110-N in FIG. 1 (and of course any other transceiver on the CAN bus 100) to make the CAN bus 100 shown in FIG. 1 a secure CAN bus. With the transceiver 120 monitoring the ECU 104-N, the ECU 104-N will no longer, after the first attempt, be able to maliciously interrupt the data communication on the CAN bus 100.

The transceiver 120 includes a transmittter (TX) 134 and a receiver (RX) 136. The transceiver 120 includes a microcontroller port 122 to send/receive data from a microcontroller or ECU. The transceiver 120 also includes a CAN bus port 138 to send/receive data to/from a CAN bus 100. The data received from the CAN bus 100 is transmitted to the microcontroller to enable the microprocessor to functionally process the data. Similarly, when a data is received from the microprocessor, the received data is transmitted to the CAN bus 100. The TX 134 translates the data received from the microprocessor in a signal that is compliant with CAN standards.

The transceiver 120 also includes a protocol decoder 128. The protocol decoder 128 may be coupled to a on chip clock source 126 that provides a synchronization clock. A bit time settings module 124 may be included to initialize the protocol decoder 128. The bit timing settings module 124 may also keep track of a current bit position in a data frame when the data frame is being processed by the protocol decoder 128. The protocol decoder 128 includes a TXD traffic detection module 130 and a RXD traffic detection 132. The TXD traffic detection module 130 monitors TXD line coupled to the microcontroller port 122 and the RXD traffic detection module 132 monitors RXD line coupled to the microcontroller port 122. A violation detector 144 is included to identify any rule violations in the data being received or being transmitted through the microcontroller port 122. The validation rules may be stored in a memory (not shown) in the protocol decoder. In one example, the validation rules are stored in a temper proof manner so that the validation rules cannot be maliciously altered. In some examples, the protocol decoder 128 may also include a processor (not shown). In other examples, the protocol decoder 128 may be implemented in hardware only.

In some examples, a RX switch 140 may be included to enable or disable RXD line and a TX switch 142 may be included to enable or disable TXD line. In some embodiments, the RX switch 140 is optional. In some embodiments, the RX switch 140 and the TX switch 142 may be controlled independently. In some other examples, the TX 134 includes an enable EN port to enable or disable the TX 134. In some examples, if the TX 134 includes the EN input, the TX switch 142 may not be included. In some examples, a different control signal may drive the RX switch 140 based on monitoring of the RXD line.

The protocol decoder 128 monitors if the microcontroller connected to the microcontroller port 122 has won or lost arbitration. If the CAN frame is tempered by a malicious microcontroller (or host or ECU), a remote node on the CAN bus 100 will stop sending further data frame due to a bit error. Normally an error frame will be send on the first 16 bit occurrences by the remote node. For the next 16 bit occurrences the remote node will be error passive and will not send error frames and stops transmitting. This event may provide a malicious microcontroller coupled with the microcontroller port 122 sixteen chances to send the remainder of the data frame containing malicious data.

If the microcontroller has lost arbitration there should be no traffic on TXD except a possible error frame or an ACK to confirm the CAN frame is received. The violation detector 144 may disable the TX 134 so that a malicious microcontroller cannot send a data to hijack the communication on the CAN bus 100. In another example, the violation detector 144 may turn the TX switch 142 off after the microcontroller sends ACK or error frame. In some embodiments, the TX switch 142 or EN signal may be activated only if the microcontroller attempts to send a data other than ACK or error frame. In some examples, if the TX switch 142 is turned off or the TX 134 is disabled, the TXD line remains disabled for a predetermined time period to stop the microcontroller from continuing to disrupt the communication.

If the TX 134 determines that the microcontroller coupled to the microcontroller port 122 has lost the arbitration and yet attempt to send a dominant bit, the protocol decoder 128 starts counting the number bits being sent. In some examples, the counting may include check the width of the dominant bit sent by the microcontroller. If the microcontroller continues to send more bits, the microcontroller may be sending a legitimate error message (6-bit long or more) and such messages are allowed to go to the CAN bus 100. However, if the microcontroller stops sending more dominant bits, the protocol decoder 128 may send the remaining bits to indicate an error condition. If the microcontroller sends more than one error messages within a preselected time interval, the protocol decoder 128 may disable the TXD line or the TX 134 for a preselected time period to prevent the microcontroller from staging a denial of service attack. In some examples, if the protocol decoder 128 detects that the microcontroller coupled with the microcontroller port 122 is sending a message identifier that the microcontroller is not authorized to send, the protocol decoder 128 may disable the TXD line or the TX 134. Similarly, in some examples, the protocol decoder 128 detects a message identifier that the microcontroller is not authorized to receive, the protocol decoder 128 may invalidate the received message to stop the message from being read by the microcontroller.

Typically, the microcontroller coupled with the microcontroller port 122 can read data being transmitted by a remote node on the CAN bus 100 that won the arbitration. The microcontroller may start sending data bits on to the CAN bus 100. In one example, upon receiving the dominant bit, remote nodes may believe that the microcontroller coupled with the microcontroller port 122 has the control of the CAN bus 100 and then the malicious the microcontroller may send a complete CAN frame with a valid CRC to highjack the CAN bus 100. In another example, because the dominant bit sent by the microcontroller will overwrite the recessive bit sent by the remote node, the CAN frame sent by the remote node will be corrupted. The protocol decoder 128 is configured to invalidate the data frame and at least temporarily disconnect, after the first attempt to corrupt the data, the microcontroller from either corrupting the data sent by the remote node or will prevent the malicious microcontroller coupled with the microcontroller port 122 from hijacking the CAN bus 100 after losing the arbitration. Note that in the description of FIG. 3, the term "microcontroller" is being used for a local host that is coupled with the microcontroller port 122. The remote node may also include an ECU or a microcontroller. However, the term "remote node" is being used for a combination of a remote microcontroller coupled to its own separate transceiver.

In some examples, if the dominant pulse is less than 6-bits, the protocol decoder 120 is configured to extend the dominant pulse on the CAN bus 100 to a longer amount, e.g., 11 dominant bits. This can be used to distinguish a security error to the CAN bus 100 from a normal error.

Optionally, if the microcontroller stops sending further bits after sending a dominant bit, after losing the arbitration, the protocol decoder 128 may continue to send more bits, total six (or more depending on the implementation), to send a legitimate error message on the CAN bus 100. The protocol decoder 128 may then disable the data transmission of the microcontroller for a preselected period (e.g., a few seconds) to prevent the microcontroller from staging a data interruption attack on the CAN bus 100.

The violation detector 144 is configured to detect if a complete frame is received from the remote host and that the microcontroller coupled with the microcontroller port 122 sends an unallowed part of the frame. If an unallowed part of the frame is send by the microcontroller, the violation detector 144 is configured to disconnect the TXD line or disable the TX 134. The violation detector 144 may also be configured to send an invalidation signal on the CAN bus 100 to invalidate the malicious frame sent by the microcontroller. The protocol decoder 128 may turn off the TX switch 142 and/or the RX switch 140 for a predetermined time. The protocol decoder 128 is configured to check if the whole frame is received properly according CAN standards.

In some examples, the transceiver 120 may not include any additional pins so that the transceiver 120 may be used as a "drop in" to replace a conventional transceiver. In the examples in which the protocol decoder 128 is implemented either fully or partially in software, the transceiver 120 may be configured to be programmed with additional data validation rules. In some examples, if the transceiver 120 is configurable to be programmed, a tamper proof security mechanism may be employed such that only authorized devices or entities may alter the existing programming stored in the transceiver 120.

In some embodiments, the transceiver 120 may include a white list stored in the memory (not shown) that provides verification of the message identifiers that are allowed to pass through the transceiver 120 over to the CAN bus 100. The message identifiers stored in the white list may be configured when the transceiver 120 is provisioned for the use. Prior to sending a message identifier to the CAN bus 100, the protocol decoder 128 checks if the message identifier being checked is allowed to be sent to the CAN bus 100 by the microcontroller. If the white list does not include the message identifier, the data frame will rejected. In some examples, If the microcontroller is not supposed to receive and accept a certain message identifier, the protocol decoder 128 will invalidate the received message such that the received data frame does not reach the microcontroller. The white list may be stored in a temper proof memory such that it cannot be altered after being provisioned. User defined settings and data processing instructions may also be stored in the memory. For example, a user may alter the time period for which the microcontroller is disabled by the protocol decoder 128.

Figure 4:
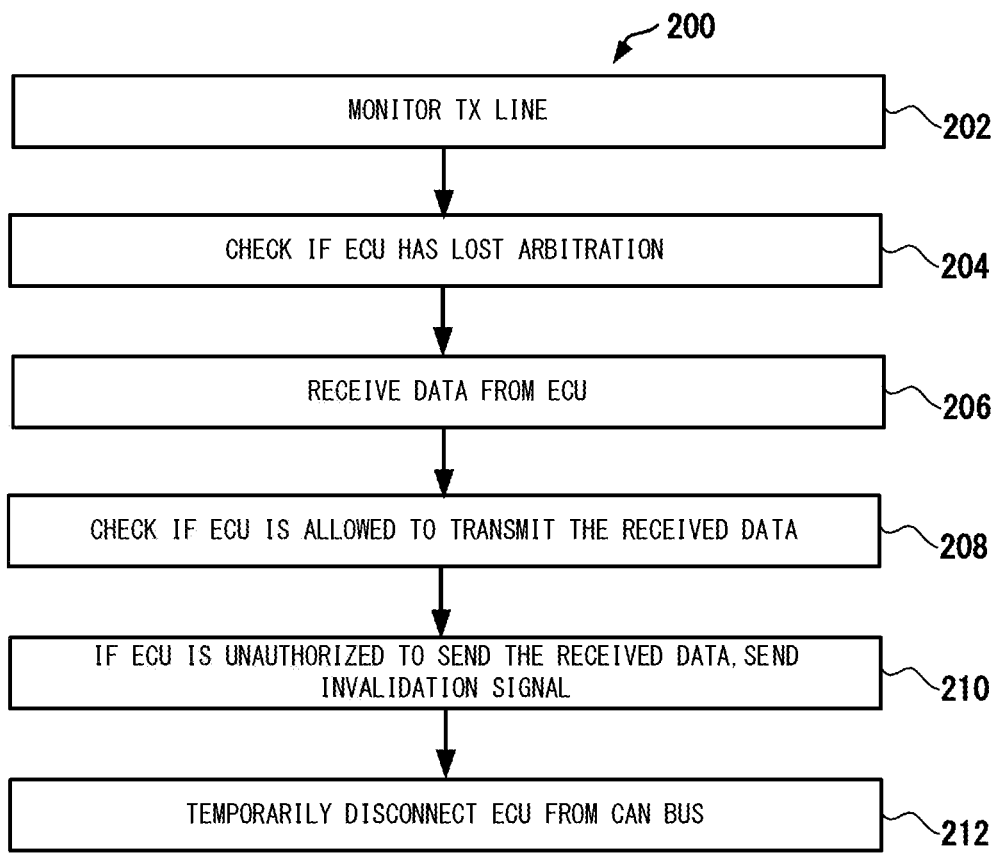
FIG. 4 illustrates a flow diagram to secure CAN data transmission in accordance with one or more embodiments of the present disclosure.

FIG. 4 shows a flow diagram 200 for prohibiting a malicious microcontroller (or ECU or local host) from disrupting or corrupting the data transmission on the CAN bus 100. Accordingly, at step 202, the protocol decoder 128 monitors a TX line that carries data from the microcontroller to the CAN bus 100 through the transceiver 120. At step 204, the protocol decoder 128 checks if the microcontroller coupled with the transceiver 120 has won or lost arbitration. At step 206, the protocol decoder 128 detects a data on the TX line. The data is sent by the microcontroller. At step 208, based on the monitoring of RXD line, the protocol decoder 128 determines if the microcontroller has won or lost arbitration. At steps 210 and 212, if the microcontroller has lost arbitration, the protocol decoder 128 checks if the data frame sent by the microcontroller includes ACK or error frame. If so, the protocol decoder 128 allows the data to be passed on to the CAN bus 100 through the TX 134. If the data is not ACK or error frame, the protocol decoder 128 may invalidate the data and disable the TX line or the TX 134 for a predetermined period. In another example, if the microcontroller has won arbitration and attempts to send a message identifier that the microcontroller is not authorized to send, the protocol decoder 128 may invalidate the data and disable the TX line or the TX 134 for a predetermined period. The protocol decoder 128 may also send a recessive bit on the CAN bus 100 to indicate to the other nodes on the CAN bus 100 that the CAN bus 100 is idle and the arbitration process may begin again.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A transceiver for sending and receiving data from a controller area network (CAN) bus, the transceiver comprising:
   a microcontroller port;
   a transmitter; and
   a receiver;
   wherein the transceiver is configured to:
      receive a data frame that includes a message identifier and a data field from a microcontroller via the microcontroller port; and
      determine, based on the message identifier in the data frame, that the microcontroller is not authorized to send the data field; and
      wherein, in response to determining that the microcontroller is not authorized, the transceiver is further configured to invalidate the data frame on a transmission line and disconnect the microcontroller from the CAN bus for a predetermined period;
      wherein the transceiver is further configured to: determine that the data frame was sent by the microcontroller after losing arbitration and that the data frame includes a partial error message; and
      wherein the transceiver is further configured to complete the partial error message and send the data frame to the CAN bus.

2. The transceiver of claim 1, wherein the invalidation includes sending a CAN error message on to the CAN bus.

3. The transceiver of claim 1, further configured to check during transmission of the data frame, the microcontroller had lost or won arbitration.

4. The transceiver of claim 3, further configured to generate and send an invalidation signal on to the CAN bus to invalidate the data frame if the microcontroller sends the data frame after losing the arbitration.

5. The transceiver of claim 3, further configured to send a dominant bit on to the CAN bus to invalidate the data frame if the controller sent the data frame after losing the arbitration.

6. The transceiver of claim 3, further configured to check if the microcontroller is authorized to send a message identifier embodied in the data frame if the controller sent the data frame after winning the arbitration.

7. The transceiver of claim 1, wherein the transmitter includes an enable port to enable or disable the transmitter.

8. The transceiver of claim 7, further configured to generate an enable/disable signal based on a detection of an unauthorized message identifier on a transmission line connected between the microcontroller port to receive an input from the microcontroller, and the transmitter.

9. The transceiver of claim 1, further including a transmission line switch in a transmission line between the microcontroller port to receive data from the microcontroller, and the transmitter.

10. The transceiver of claim 8, further configured to turn the transmission line switch off based on a detection of an unauthorized message identifier on the transmission line.

11. The transceiver of claim 4, wherein the generation of the invalidation signal includes checking if the data frame received from the microcontroller does not contain the invalidation signal.

12. The transceiver of claim 3, further configured to allow the microcontroller to send an acknowledgement message.

13. The transceiver of claim 1, further including a receiver line to connect the receiver to the microcontroller port, wherein the receiver line includes a receiver line switch for enabling or disabling the receiver line.

14. The transceiver of claim 13, further configured to disable the receiver line upon detecting a predetermined message identifier in a received message that is received from the CAN bus via the receiver.

15. The transceiver of claim 1, further configured to generate a CAN error message upon detecting a dominant bit on a transmission line that connects the transmitter and the microcontroller through the microcontroller port.

16. A method for preventing a node from interrupting a communication on a controller area network (CAN) bus, the method comprising:
- receiving a data frame from a node via a transceiver comprising a microcontroller port, a transmitter, and a receiver;
- determining, using the transceiver, that the node is not authorized to send the data frame based on a message identifier in the data frame;
- in response to determining that the node is not authorized to send the data frame, invalidating the data frame and disconnecting the microcontroller from the CAN bus for a predetermined period;
- wherein the method further comprises:
    - the transceiver determining that the data frame was sent by the node after losing arbitration and that the data frame includes a partial error message; and
    - the transceiver completing the partial error message and sending the data frame to the CAN bus.

17. The method of claim 16, further including detecting if the node has won arbitration prior to the invalidating.

18. The method of claim 17, further including checking if the node has lost the arbitration and allowing the node to send an acknowledgement or a CAN error message only.

* * * * *